United States Patent
Cunningham et al.

(10) Patent No.: US 10,938,939 B2
(45) Date of Patent: Mar. 2, 2021

(54) CLIENT-SIDE QUALITY-OF-SERVICE (QOS) FOR VIEWING OF ADAPTIVE BITRATE (ABR) STREAMS

(71) Applicant: Cisco Technology, Inc., San Jose, CA (US)

(72) Inventors: James Cunningham, Winchester (GB); Ian Bastable, Fareham (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 183 days.

(21) Appl. No.: 16/104,810

(22) Filed: Aug. 17, 2018

(65) Prior Publication Data

US 2020/0059528 A1    Feb. 20, 2020

(51) Int. Cl.
*H04L 29/08* (2006.01)
*H04L 29/06* (2006.01)

(52) U.S. Cl.
CPC ...... *H04L 67/2842* (2013.01); *H04L 65/4084* (2013.01); *H04L 65/4092* (2013.01); *H04L 65/601* (2013.01); *H04L 65/80* (2013.01); *H04L 67/02* (2013.01)

(58) Field of Classification Search
CPC . H04L 67/2842; H04L 65/80; H04L 65/4092; H04L 65/601; H04L 65/4084; H04L 67/02; H04L 65/1069
See application file for complete search history.

(56) References Cited

U.S. PATENT DOCUMENTS

| | | | |
|---|---|---|---|
| 9,628,405 B2 | 4/2017 | Dasher et al. | |
| 9,729,611 B2 | 8/2017 | Bowen et al. | |
| 9,813,470 B2 | 11/2017 | Phillips et al. | |
| 2014/0282262 A1* | 9/2014 | Gregotski | H04N 21/8549 715/838 |
| 2015/0127844 A1* | 5/2015 | Phillips | H04L 67/22 709/231 |
| 2015/0256581 A1* | 9/2015 | Kolhi | H04N 21/4126 709/219 |
| 2015/0288617 A1* | 10/2015 | Dasher | H04N 21/23439 709/226 |
| 2016/0366202 A1 | 12/2016 | Phillips et al. | |
| 2017/0171264 A1 | 6/2017 | Salomons | |
| 2017/0188054 A1* | 6/2017 | Ma | H04L 67/02 |
| 2018/0359529 A1* | 12/2018 | Hasek | H04N 21/2396 |
| 2019/0007756 A1* | 1/2019 | Navali | H04L 63/0428 |

* cited by examiner

*Primary Examiner* — Nicholas R Taylor
*Assistant Examiner* — Tania M Pena-Santana
(74) *Attorney, Agent, or Firm* — Merchant & Gould P.C.

(57) ABSTRACT

Client-side Quality-of-Service (QoS) for viewing of Adaptive Bitrate (ABR) streams may be provided. First, a plurality of Adaptive Bitrate (ABR) objects corresponding to a first video rendition of a content program may be downloaded from a Content Delivery Network (CDN) in non-real-time. The plurality of ABR objects may comprise a portion of ABR objects comprising the content program. Next, the plurality of ABR objects downloaded in non-real-time may be stored in a cache. At least a portion of the content program may then be retrieved in real-time using ABR streaming. Retrieving the at least a portion of the content program may comprise obtaining a first ABR object corresponding to the content program and a second ABR object corresponding to the content program.

20 Claims, 2 Drawing Sheets

CLIENT-SIDE QUALITY-OF-SERVICE (QOS) FOR VIEWING OF ADAPTIVE BITRATE (ABR) STREAMS

TECHNICAL FIELD

The present disclosure relates generally to Adaptive Bitrate (ABR) streaming.

BACKGROUND

Adaptive Bitrate (ABR) streaming is a method of video streaming over Hypertext Transfer Protocol (HTTP) where the source content is encoded at multiple bit rates, each of the different bit rate streams are segmented into the same small multi-second parts. The streaming client is made aware of the available streams at differing bit rates, and segments of the streams by a manifest file. With Video on demand (VOD), the content streams are available to the client prior to viewing. When starting, the client may request the segments from the lowest bit rate stream. If the client finds the download speed is greater than the bit rate of the segment downloaded, then it may request higher bit rate segments. Later, if the client determines, in order to sustain ongoing viewing without interruption, that a segment with a lower bit rate must be downloaded, then it may request a lower bit rate segment. The segment size can vary depending on the particular implementation, but they are typically between two and ten seconds.

The use of ABR streaming to deliver high quality VOD means that it is not always possible to view in high quality when the ABR client needs to drop the bit rate in order to sustain viewing. This problem has been solved by using progressive download where the viewer must wait for the content to become available for viewing. Typically, either the whole content must be downloaded or enough content to sustain viewing from the beginning at normal speed whilst the download continues. When using such a progressive download solution: i) the user typically has to wait for an indeterminate period of time before they can start playback, dependent on the bitrate of the content and available network bandwidth, which is affected by other activities within the home; ii) the user can typically only view what has been downloaded, meaning that if the user reaches the end of the download, they wait for more content to be downloaded before resuming viewing again; and iii) the client device must have sufficient storage for the entire asset to be fully downloaded.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
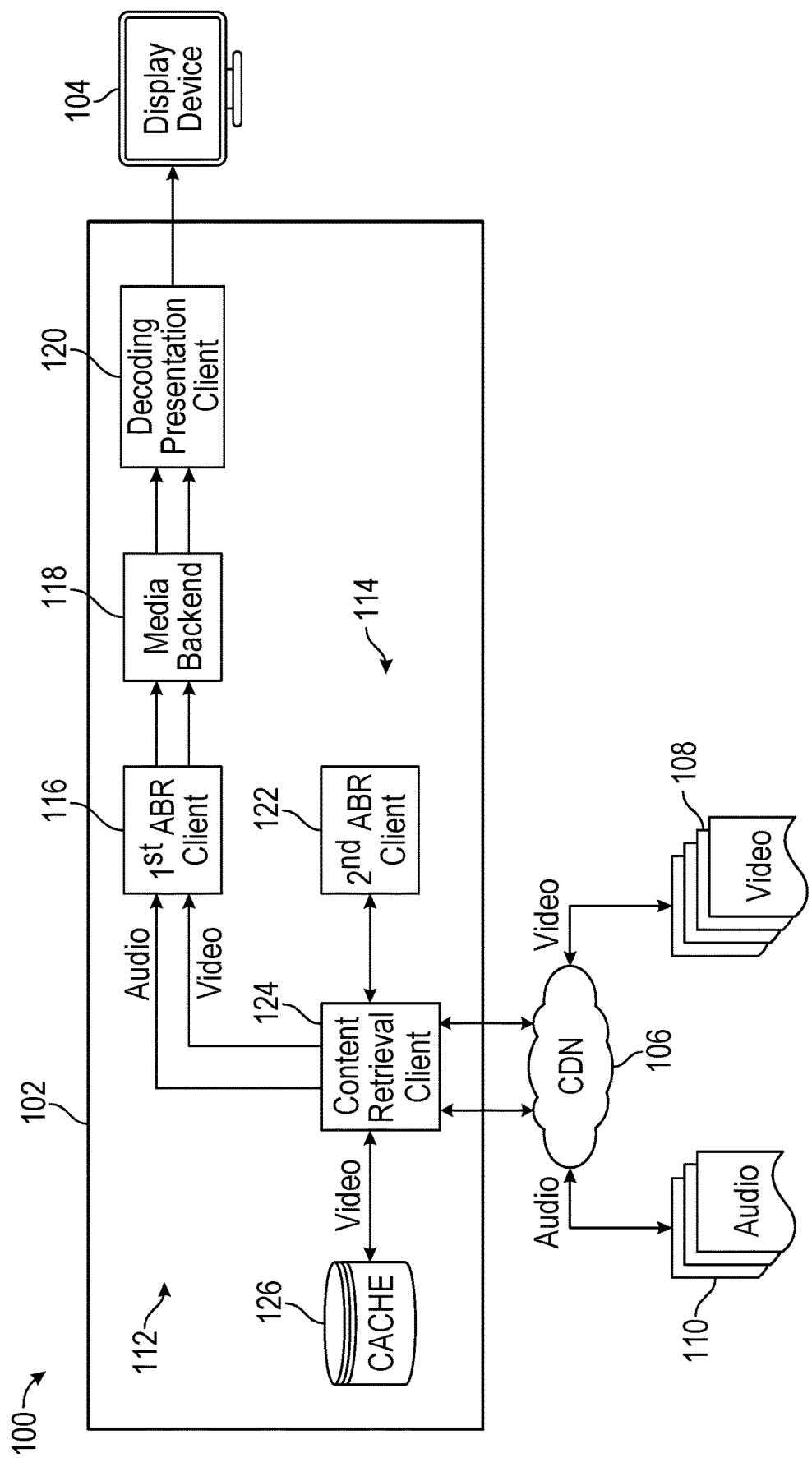
FIG. 1 is a block diagram of a networking system.

Client-side Quality-of-Service (QoS) for viewing of Adaptive Bitrate (ABR) streams may be provided. First, a plurality of Adaptive Bitrate (ABR) objects corresponding to a first video rendition of a content program may be downloaded from a Content Delivery Network (CDN) in non-real-time. The plurality of ABR objects may comprise a portion of ABR objects comprising the content program. Next, the plurality of ABR objects downloaded in non-real-time may be stored in a cache. At least a portion of the content program may then be retrieved in real-time using ABR streaming. Retrieving the at least a portion of the content program may comprise obtaining a first ABR object corresponding to the content program and a second ABR object corresponding to the content program.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Using ABR streaming to deliver, for example, Ultra High Definition (UHD) quality Video on Demand (VOD) may not provide the ability to view in UHD quality when an ABR client needs to drop quality in order to sustain viewing. Embodiments of the disclosure may provide a user the choice of content access speed verses viewing at a highest quality, and a way for the user to adapt their viewing as their needs change.

VOD assets may be available in different video renditions with the same timelines for rendering on different devices. The different video renditions may comprise, but are not limited to, Ultra High Definition (UHD) High Dynamic Range (HDR), UHD Standard Dynamic Range (SDR), High Definition (HD), and Standard Definition (SD). Consistent with embodiments of the disclosure, when a user requests to view a VOD asset, a non-real-time download of the highest quality video representation may be started from an ABR Master Playlist of the VOD content. Video objects from this download may be locally cached at the HTTP layer.

When the user starts to view the VOD asset, a real-time ABR streaming is started. During streaming, an ABR client may be instructed to start with the highest quality video representation, but switch representations as required to maintain real-time viewing. Consistent with embodiments of the disclosure, if it is possible, video segments may be served from the local cache that have already been downloaded during the non-real-time download. Audio segments may be retrieved from a CDN. Cache-misses (at the local cache) for the real-time ABR streaming may be acquired from the CDN at a priority above the ongoing non-real-time download.

During streaming of the VOD asset, the user may be allowed to seek to any part of the content program. Furthermore, a downloaded content buffer indicator may be displayed to the user. This indictor may show how much of the content program is in the cache as compared to the total amount of the content program and what point the user's viewing is at in the content program. From this indicator, the user may determine whether viewing is within the non-real-time, high-quality download buffer or outside. In this way, the user may decide to view within the high-quality download buffer. Or, if the user decides to view outside the high-quality download buffer, the user may know that there is a risk of the ABR client dropping quality in order to sustain viewing should there be a bandwidth issue.

Accordingly, embodiments of the disclosure may allow a user to seamlessly transition their streaming experience between constant-quality downloaded content and ABR streaming according to their viewing needs (i.e., quality verses access). Embodiments of the disclosure may lower the network bandwidth requirements for UHD quality viewing experience using ABR streaming technologies and may be applicable to both VOD and Cloud Digital Video Recorder (CDVR) based systems. Furthermore, embodiments of the disclosure may be adaptable to meet the needs of various streaming devices within a home with different streaming/viewing capabilities.

FIG. 1 is a block diagram of an operating environment 100 consistent with embodiments of the disclosure. As shown in FIG. 1, operating environment 100 may comprise a content device 102, a display device 104, a Content Delivery Network (CDN) 106, audio objects 110, and video objects 108. Content device 102 may comprise a streaming pipeline 112 and a download pipeline 114. Streaming pipeline 112 may comprise a first ABR client 116, a media backend 118, and a decoding and presentation client 120. Download pipeline 114 may comprise a second ABR client 122, a content retrieval client 124, and a cache 126.

Content device 102 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. Consistent with embodiments of the disclosure, streaming pipeline 112 and download pipeline 114 may be disposed in separate devices.

CDN 106 may comprise a collection of web servers and network components and may be used to accelerate delivery of web content to client devices. CDN 106 may comprise a distributed system of caches that may hold more popular content closer to clients to decrease latency and bandwidth costs over network backbones. CDN 106 may hold any type of static web content (e.g., HTML pages, images, and JavaScript) and may be useful for caching video content.

In operating environment 100, audio objects and video objects corresponding to a content program may be handled separately. For example, video objects 108 cached in CDN 106 may include video objects for various different video renditions of a content program. These different video renditions may comprise, but are not limited to, Ultra High Definition (UHD) High Dynamic Range (HDR), UHD Standard Dynamic Range (SDR), High Definition (HD), and Standard Definition (SD). Similarly, audio objects 110 cached in CDN 106 may include audio objects for various different audio renditions of the content program. These different audio renditions may comprise, but are not limited to, various different spoken languages.

The elements of operating environment 100 (e.g., content device 102, first ABR client 116, media backend 118, decoding and presentation client 120, second ABR client 122, and content retrieval client 124) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment may be practiced in a computing device 300.

Display device 104 may comprise any type device upon which a content program may be displayed. For example, display device 104 may comprise, but is not limited to, a television (TV), a computer display, or a smartphone screen. While FIG. 1 shows display device 104 being separate, display device 104 may be incorporated into content device 102. Display device 104 may comprise the ability to display video at a predefined highest standard. This predefined highest standard may comprise, but is not limited to, one of the following: UHDHDR, UHDSDR, HD, or SD.

Figure 2:
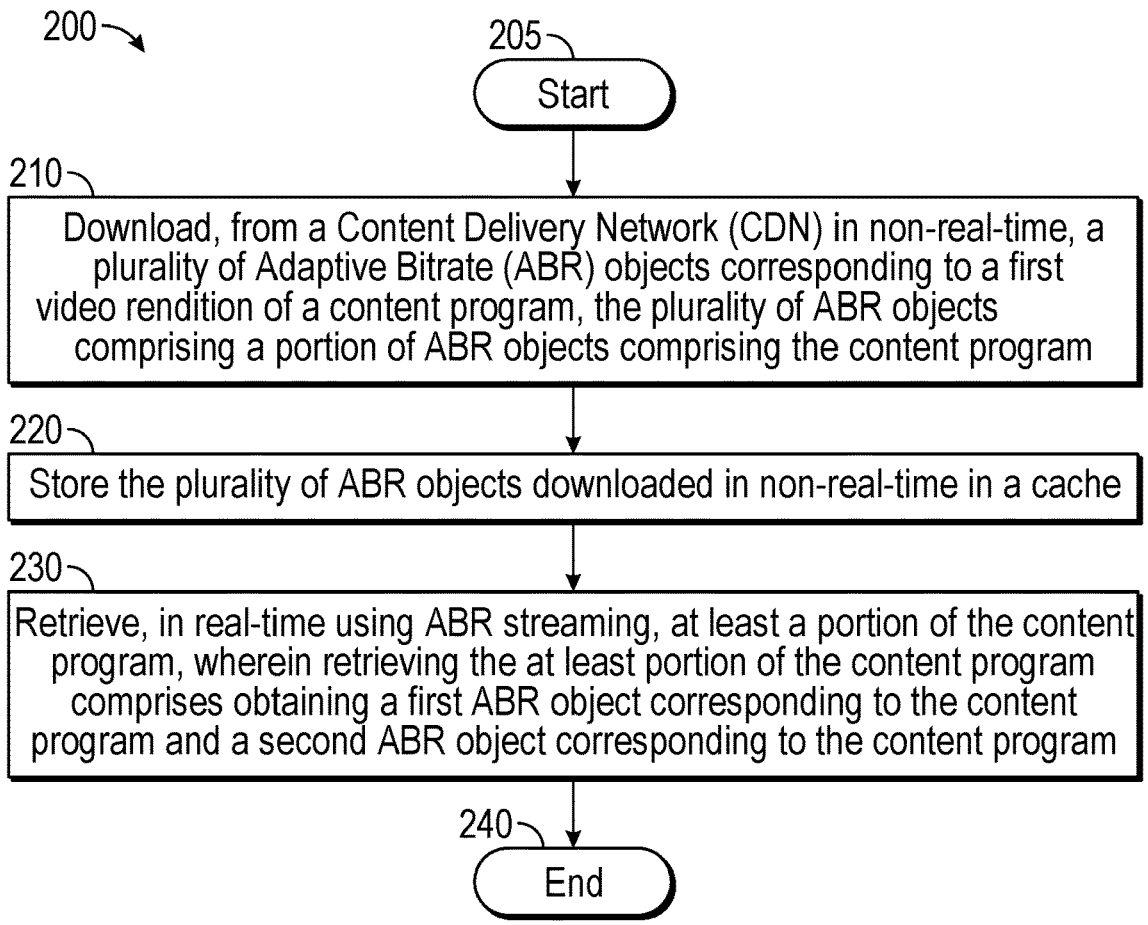
FIG. 2 is a flow chart of a method for providing client-side Quality-of-Service (QoS) for viewing of Adaptive Bitrate (ABR) streams.

FIG. 2 is a flow chart setting forth the general stages involved in a method 200 consistent with an embodiment of the disclosure for providing client-side Quality-of-Service (QoS) for viewing of Adaptive Bitrate (ABR) streams. Method 200 may be implemented using content device 102 as described in more detail below with respect to FIG. 1. Ways to implement the stages of method 200 will be described in greater detail below.

Method 200 may begin at starting block 205 and proceed to stage 210 where second ABR client 122 may download, from CDN 106 in non-real-time, a plurality of ABR objects corresponding to a first video rendition of a content program. The plurality of ABR objects may comprise a portion of ABR objects comprising the content program. For example, when a user requests to view the content program, a non-real-time download of the highest quality video representation may be started from an ABR master playlist. This non-real-time download may comprise second ABR client 122 making requests (e.g., HTTP requests) via content retrieval client 124 to CDN 106 based on the ABR master playlist. This non-real-time download may be at a lower priority than the streaming described below so as not to interfere with real-time viewing of the content program. The first video rendition may comprise, for example, the highest quality level at which display device 104 can provide (or operate at) or the highest quality level represented in the ABR master playlist. A plurality of different video renditions may be provided on CDN 106. Each video rendition may be provided on CDN 106 as an adaptation set, comprising one or more different quality video representations for example.

From stage 210, where second ABR client 122 downloads the plurality of ABR objects, method 200 may advance to stage 220 where the action of second ABR client 122 may cause content retrieval client 124 to store the plurality of ABR objects downloaded in non-real-time in cache 126. For example, ABR objects (e.g., video segments) received in response (e.g., HTTP responses from CDN 106) to the aforementioned requests during this non-real-time download may be locally cached in cache 126 at the HTTP layer by content retrieval client 124.

Once the actions of second ABR client 122 has caused content retrieval client 124 to store the plurality of ABR objects in stage 220, method 200 may continue to stage 230 where first ABR client 116 may retrieve, in real-time using ABR streaming, at least a portion of the content program. Retrieving the at least a portion of the content program may comprise obtaining a first ABR object corresponding to the content program from either cache 126 or CDN 106 and a second ABR object corresponding to the content program from either cache 126 or CDN 106.

During streaming, first ABR client 116 may be instructed to start with the highest quality video representation, but may switch representations as needed to maintain real-time viewing. Consistent with embodiments of the disclosure, first ABR client 116 may send content retrieval client 124 a request for the first ABR object. Because the first ABR object may have already been cached in cache 126 as a result of the non-real-time download, content retrieval client 124 may service this request for the first ABR object from cache 126.

Consistent with embodiments of the disclosure, first ABR client 116 may send content retrieval client 124 a request for the second ABR object. Because the second ABR object may not yet have been cached in cache 126 as a result of the non-real-time download, content retrieval client 124 may service this request for the second ABR object from CDN 106. In other words, if it is possible, objects may be served from cache 126 that have already been downloaded during the non-real-time download. Cache-misses at cache 126 during playback (i.e., in real-time) may be acquired from CDN 106 at a priority above the ongoing non-real-time download. Audio segments may be retrieved from CDN 106.

During streaming of the content program, first ABR client 116 may pass objects (e.g., audio and video) to media backend 118 and decoding and presentation client 120 from where the content program may be rendered and displayed on display device 104. During viewing on display device 104, the user may be allowed to seek to any part of the content program. Furthermore, a downloaded content buffer indicator may be displayed on display device 104. This indictor may show how much of the content program is in cache 126 as compared to the total amount of the content program and what point the user's viewing is at in the content program. From the indicator, the user may determine whether viewing is within the non-real-time high-quality download buffer (i.e., in cache 126) or outside. In this way, the user may decide to view within the high-quality download buffer. Or, if the user decides to seek outside the high-quality download buffer, the user may know that there is a risk of first ABR client 116 dropping quality in order to sustain viewing should there be a bandwidth issue. Once first ABR client 116 retrieves, in real-time using ABR streaming, the at least a portion of the content program in stage 230, method 200 may then end at stage 240.

Figure 3:
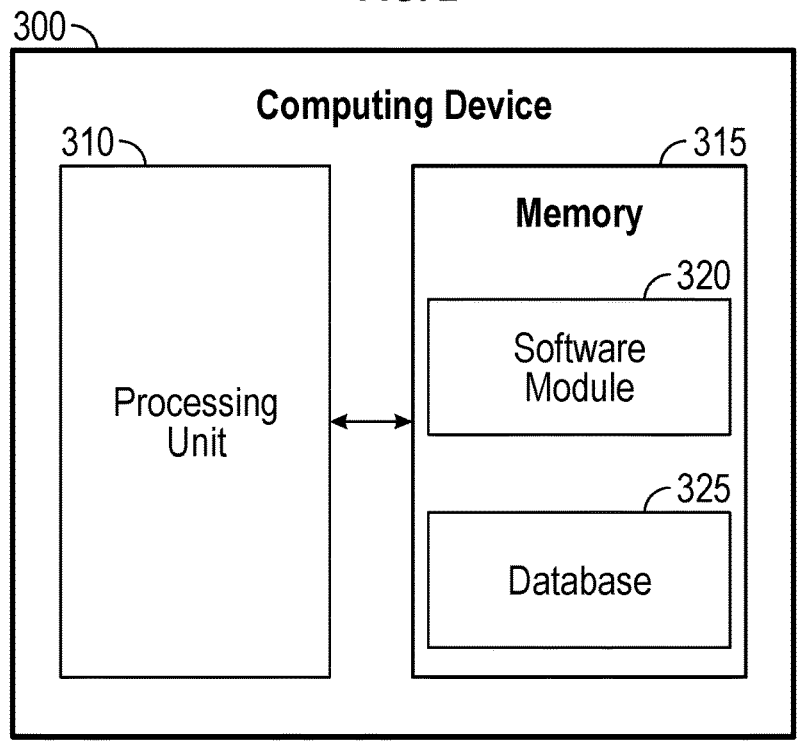
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing client-side QoS for viewing of ABR streams, including for example, any one or more of the stages from method 200 described above with respect to FIG. 2. Computing device 300, for example, may provide an operating environment for content device 102, first ABR client 116, media backend 118, decoding and presentation client 120, second ABR client 122, and content retrieval client 124. Content device 102, first ABR client 116, media backend 118, decoding and presentation client 120, second ABR client 122, and content retrieval client 124 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   downloading, from a Content Delivery Network (CDN) in non-real-time, a plurality of Adaptive Bitrate (ABR) objects corresponding to a first video rendition of a content program, the plurality of ABR objects comprising a portion of ABR objects comprising the content program;
   storing the plurality of ABR objects downloaded in non-real-time in a cache; and
   retrieving, in real-time using ABR streaming, at least a portion of the content program, wherein retrieving the at least a portion of the content program comprises obtaining a first ABR object corresponding to the content program and a second ABR object corresponding to the content program, wherein obtaining the first ABR object and the second ABR object comprises:
      receiving the first ABR object corresponding to the content program from the cache when the first ABR object comprises one of the plurality of ABR objects downloaded from the CDN in non-real-time and stored in the cache, and
      receiving the second ABR object corresponding to the content program from the CDN in real time when the second ABR object does not comprise one of the plurality of ABR objects stored in the cache.

2. The method of claim 1, wherein downloading the plurality of ABR objects is performed with a lower bandwidth priority than retrieving the at least a portion of the content program.

3. The method of claim 1, wherein downloading the plurality of ABR objects corresponding to the first video rendition of the content program comprises downloading the plurality of ABR objects corresponding to the first video rendition comprising one of the following: Ultra High Definition (UHD) High Dynamic Range (HDR), UHD Standard Dynamic Range (SDR), and High Definition (HD).

4. The method of claim 1, wherein downloading the plurality of ABR objects corresponding to the first video rendition of the content program comprises downloading the plurality of ABR objects corresponding to the first video rendition comprising a highest quality at which a device retrieving the at least a portion of the content program can provide.

5. The method of claim 1, wherein downloading the plurality of ABR objects comprises downloading the plurality of ABR objects corresponding only to video.

6. The method of claim 1, wherein downloading the plurality of ABR objects comprises downloading the plurality of ABR objects corresponding to video and audio.

7. The method of claim 1, wherein downloading the plurality of ABR objects comprises downloading the plurality of ABR objects comprising Hypertext Transfer Protocol (HTTP) objects.

8. The method of claim 1, wherein downloading the plurality of ABR objects comprises downloading the plurality of ABR objects in response to receiving, from a user, a request to view the content program.

9. The method of claim 8, wherein retrieving the at least a portion of the content program comprises retrieving the at least a portion of the content program in response to receiving, from the user, a request to play the content program.

10. The method of claim 1, wherein receiving the first ABR object from the cache comprises receiving the first ABR object from a content retrieval client that obtains the first ABR object from the cache in response to the content retrieval client determining that the first ABR object comprises one of the plurality of ABR objects stored in the cache.

11. The method of claim 1, wherein receiving the second ABR object from the CDN comprises receiving the second ABR object from a content retrieval client that obtains the second ABR object from the CDN in response to the content retrieval client determining that the second ABR object does not comprises one of the plurality of ABR objects stored in the cache.

12. The method of claim 1, further comprising providing an indication as to which portion of the content program corresponds to the plurality of ABR objects downloaded in the cache.

13. A system comprising:
   a memory storage; and a processing unit coupled to the memory storage, wherein the processing unit is operative to:
  download, from a Content Delivery Network (CDN) in non-real-time, a plurality of Adaptive Bitrate (ABR) objects corresponding to a first video rendition of a content program, the plurality of ABR objects comprising a portion of ABR objects comprising the content program;
  store the plurality of ABR objects downloaded in non-real-time in a cache; and
  retrieve, in real-time using ABR streaming, at least a portion of the content program, wherein the processing unit being operative to retrieve the at least a portion of the content program comprises the processing unit being operative to obtain a first ABR object corresponding to the content program and a second ABR object corresponding to the content program, wherein the processing unit being operative to obtain the first ABR object and the second ABR object comprises the processing unit being operative to:
    receive the first ABR object corresponding to the content program from the cache when the first ABR object comprises one of the plurality of ABR objects downloaded from the CDN in non-real-time and stored in the cache, and
    receive the second ABR object corresponding to the content program from the CDN in real time when the second ABR object does not comprise one of the plurality of ABR objects stored in the cache.

14. The system of claim 13, wherein the processing unit is operative to download the plurality of ABR objects with a lower bandwidth priority than at which it retrieves the at least a portion of the content program.

15. The system of claim 13, wherein the first video rendition comprises a highest quality at which a device retrieving the at least a portion of the content program can provide.

16. The system of claim 13, wherein the processing unit is further operative to provide an indication as to which portion of the content program corresponds to the plurality of ABR objects downloaded in the cache.

17. A computer-readable medium that stores a set of instructions which when executed perform a method comprising:
  downloading, from a Content Delivery Network (CDN) in non-real-time, a plurality of Adaptive Bitrate (ABR) objects corresponding to a first video rendition of a content program, the plurality of ABR objects comprising a portion of ABR objects comprising the content program;
  storing the plurality of ABR objects downloaded in non-real-time in a cache; and
  retrieving, in real-time using ABR streaming, at least a portion of the content program, wherein retrieving the at least a portion of the content program comprises obtaining a first ABR object corresponding to the content program and a second ABR object corresponding to the content program, wherein obtaining the first ABR object and the second ABR object comprises:
    receiving the first ABR object corresponding to the content program from the cache when the first ABR object comprises one of the plurality of ABR objects downloaded from the CDN in non-real-time and stored in the cache, and
    receiving the second ABR object corresponding to the content program from the CDN in real time when the second ABR object does not comprise one of the plurality of ABR objects stored in the cache.

18. The computer-readable medium of claim 17, wherein downloading the plurality of ABR objects is performed with a lower bandwidth priority than retrieving the at least a portion of the content program.

19. The computer-readable medium of claim 17, wherein downloading the plurality of ABR objects corresponding to the first video rendition of the content program comprises downloading the plurality of ABR objects corresponding to the first video rendition comprising a highest quality at which a device retrieving the at least a portion of the content program can provide.

20. The computer-readable medium of claim 17, further comprising providing an indication as to which portion of the content program corresponds to the plurality of ABR objects downloaded in the cache.

* * * * *